H. L. SCHOLL.
STOCK REST.
APPLICATION FILED JULY 5, 1919.

1,329,550.

Patented Feb. 3, 1920.

WITNESS
Gustav Genzlinger.

INVENTOR.
HARRY L. SCHOLL.
BY Chas. N. Butler
atty

UNITED STATES PATENT OFFICE.

HARRY L. SCHOLL, OF WEST CHESTER, PENNSYLVANIA.

STOCK-REST.

1,329,550.  Specification of Letters Patent.  Patented Feb. 3, 1920.

Application filed July 5, 1919. Serial No. 308,793.

*To all whom it may concern:*

Be it known that I, HARRY L. SCHOLL, a citizen of the United States, residing at West Chester, in the county of Chester and State of Pennsylvania, have invented a Stock-Rest, of which the following is a specification.

My invention is a rest for holding stock, such as iron bars in process of manufacture into various commodities as by means of lathes. The primary object of my improvements is to provide a simple and convenient device which can be opened to receive a bar by the pressure of the latter and which will close automatically on such bar to hold the same in the desired position, without preventing its desired movement.

My improvements, in their preferred form, comprise a body adapted to be supported upon a post, a seat or bearing supported by said body so that it can be removed and replaced in case of wear or the desire to substitute a different form or size therefor, and one or more spring pressed reciprocating jaws adapted to be retracted by the pressure of the work placed thereon to admit the same to its seat and to automatically close on the seated work to hold it in the desired position.

The characteristic features of my improvements are embodied in the form thereof set forth in the following description and the accompanying drawings in illustration thereof.

Figure 1:
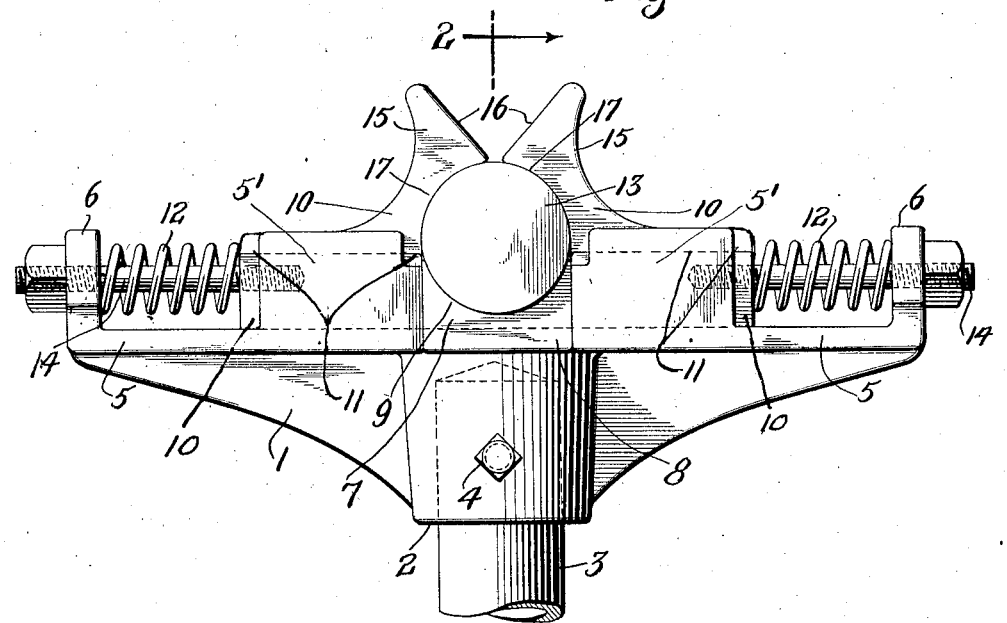
Figure 2:
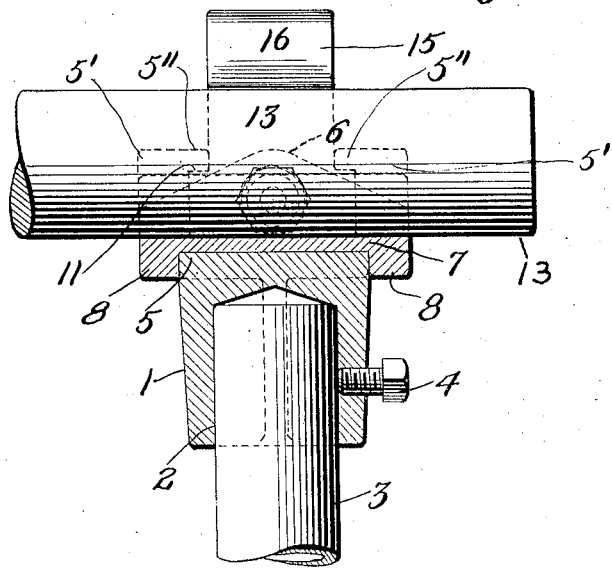

In the drawings, Figure 1 is a side elevation of a stock rest or work holder embodying my improvements, and Fig. 2, is a sectional view taken on the line 2—2 of Fig. 1.

The mechanism illustrated in the drawings comprises the base 1 which is provided with the socket 2 adapted to receive the end of a supporting column or post 3, the parts being fixed together adjustably by a set screw 4 passing through the wall of the socket. The base has the way or ways 5 disposed transversely to the axis of the socket 2 and provided with the side guards 5′ having the inwardly extending flanges 5″, bearings 6 being provided at the respective ends of the way or ways.

A seat or bearing 7, having the downwardly extending flanges 8 engaging the opposite edges of the way 5, is provided with a concave bearing surface 9, the seat being removable so that substitutions may be made therefor in case of breakage, wear or desired variation in size.

Slides 10 are adapted to reciprocate on the way or ways 5 between the guards 5′, being provided with the shoulders 11 which lie under the flanges 5″ for holding them on the ways.

Coiled springs 12 are disposed between the flanges or bearings 6 and the slides 10, to hold the latter normally in their forward positions against the seat 7 and to permit them to be retracted for the introduction and removal of the work as the bar 13.

Rods or stems 14 pass freely through the respective bearings 6 and the springs 12 into threaded engagement with the slides 10 to control the latter and the springs.

The slides 10 are provided with the respective forwardly projecting or over-hanging jaws 15 having the oppositely inclined outer surfaces 16 and the concave inner surfaces 17 preferably adapted to conform to the work.

It will be understood that if a bar 13 which is to be operated upon is placed upon the jaws 15 in contact with the oppositely inclined surfaces 16, the weight of such bar, with or without additional pressure, will act through such jaws to retract the slides 10 against the actions of the springs 12 and permit the bar to pass between the jaws to the seat 7; the slides being automatically returned to their forward positions when the bar is seated so that it will be held in position by the jaws.

Usually the rod or bar 13 will be fed through the rest and removed therefrom longitudinally without retracting the slides 10, which are, however, readily retracted against the actions of the springs when it is desired to remove the bar therefrom.

It will be understood that changes may be made within the scope of the invention as by the use of a single slide 10 whose jaw 15 coöperates with a fixed complementary jaw 15, and that the device may be used in any relation requiring its function of holding a movable device adapted to be engaged thereby.

Having described my invention, I claim:

1. A rest provided with a way and a seat, in combination with a spring pressed slide adapted to reciprocate along said way and a jaw adapted to engage work to said seat.

2. A rest provided with a way and a seat, in combination with a spring pressed slide adapted to reciprocate along said way, said slide having a jaw adapted to overhang said seat and an inclined surface for effecting its retraction by pressure thereon.

3. A rest provided with a base having a seat thereon and spring pressed slides adapted to reciprocate on said base, said slides having forwardly projecting jaws for engaging work placed on said seat and oppositely inclined surfaces for effecting their retraction by pressure thereon.

4. A rest having a base, a detachable seat engaged on said base, and slides adapted to reciprocate between said seat and bearings, and said slides having forwardly projecting jaws adapted for holding work on said seat.

5. A rest having a base provided with ways and bearings, slides having flanges whereby they are yoked on said ways in reciprocatory relation thereto, said slides having forwardly projecting jaws with oppositely inclined surfaces adapted for effecting their retraction by pressure thereon, and springs disposed between said bearings and slides.

6. A rest having a base provided with a socket, slide ways and bearings at the ends of said slide ways, in combination with a seat detachably connected with said base, slides adapted to reciprocate on the respective ways between the respective bearings and said seat, said slides having forwardly projecting jaws adapted for holding work on said seat and springs disposed between said bearings and slides for effecting the movement of the latter toward said seat.

7. A rest provided with a work support in combination with means comprising a spring pressed reciprocating device for engaging work to said support; said device provided with an inclined surface for effecting its retraction by the pressure of work thereon.

In testimony whereof I have hereunto signed my name this 1st day of July, 1919.

HARRY L. SCHOLL.